United States Patent
Cedervall et al.

(10) Patent No.: US 8,416,797 B2
(45) Date of Patent: Apr. 9, 2013

(54) PROVIDING IPTV MULTICASTS

(75) Inventors: Mats Cedervall, Härnösand (SE); Hans Byström, Sundbyberg (SE); Torbjörn Einarsson, Stockholm (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 12/514,239

(22) PCT Filed: Apr. 3, 2007

(86) PCT No.: PCT/EP2007/053266
§ 371 (c)(1),
(2), (4) Date: Dec. 2, 2009

(87) PCT Pub. No.: WO2008/055712
PCT Pub. Date: May 15, 2008

(65) Prior Publication Data
US 2010/0091772 A1    Apr. 15, 2010

(30) Foreign Application Priority Data
Nov. 10, 2006   (SE) ...................................... 0602410

(51) Int. Cl.
*H04J 3/26*   (2006.01)

(52) U.S. Cl.
USPC ............................ 370/432; 370/352; 370/401

(58) Field of Classification Search ................. 370/432, 370/352, 401, 392; 709/205
See application file for complete search history.

(56) References Cited

U.S. PATENT DOCUMENTS

| | | | |
|---|---|---|---|
| 6,728,965 B1 | 4/2004 | Mao | |
| 2005/0216752 A1* | 9/2005 | Hofmeyr et al. | 713/189 |
| 2006/0159117 A1* | 7/2006 | Furlong et al. | 370/432 |
| 2006/0242240 A1* | 10/2006 | Parker et al. | 709/205 |
| 2007/0097955 A1* | 5/2007 | Li et al. | 370/352 |
| 2007/0101012 A1* | 5/2007 | Li et al. | 709/231 |
| 2007/0204320 A1* | 8/2007 | Wu et al. | 725/135 |
| 2007/0230496 A1* | 10/2007 | Guo et al. | 370/432 |
| 2008/0066095 A1* | 3/2008 | Reinoso | 725/28 |
| 2008/0163288 A1* | 7/2008 | Ghosal et al. | 725/31 |
| 2008/0176577 A1* | 7/2008 | Bourlas et al. | 455/454 |

FOREIGN PATENT DOCUMENTS
EP    1638334 A    3/2006

* cited by examiner

*Primary Examiner* — Chuong T Ho

(57) ABSTRACT

A method and system of operating a Reliable Transmission Protocol switch node to provide an IPTV multicast is provided. According to an embodiment of the invention, IP packets transporting an encrypted media stream are received from an IPTV Head-end. The media stream contains complete image frames. Unencrypted identifiers identifying packets containing complete image frame data are also received. The received packets are stored in a buffer, and on receipt of a request from a media renderer to provide the IPTV multicast, the packet(s) containing the last complete image frame in the media stream and all subsequent packets are sent to the media renderer.

14 Claims, 3 Drawing Sheets

PROVIDING IPTV MULTICASTS

TECHNICAL FIELD

The invention relates to the field of providing an IPTV multicast, and in particular to method of providing an IPTV multicast when switching between channels.

BACKGROUND

TV services broadcast over an IP network are referred to as IPTV. IPTV is typically broadcast using a broadband access network, and the predominant IPTV service is Broadcast TV, in which the normal non-IPTV channels, as well as additional channels with low penetration are transmitted over the broadband network from a super head-end down to an end-user's set top box (STB).

Linear content delivery, in which all channels in a subscription are simultaneously delivered to a user's set top box (STB) is not suitable for IPTV, as IPTV has limited bandwidth available over a broadband connection. A typical ADSL broadband connection provides a capacity of between 3 and 8 Mbps, and ADSL2 promises to deliver up to 25 Mbps downstream, whereas VDSL can provide a capacity of greater than 30 Mbps. Standard quality MPEG 2 IPTV content requires 2 Mbps per channel, and HDTV will require around 8-10 Mbps per channel The MPEG 4 standard will approximately halve the bandwidth required to deliver IPTV content with the same quality. Nevertheless, the available bandwidth is a scarce resource, and IPTV solutions must limit the number of channels that can be delivered simultaneously.

In order to minimize the bandwidth required for transmission of IPTV content, it is necessary to use multicast techniques through the network. When the end-user switches from one channel to another, the STB sends out an Internet Group Management Protocol (IGMP) Leave message for the channel that the STB is currently receiving, and an IGMP Join message for the new channel that the user wishes to receive.

The IPTV content contains MPEG (normally 2 or 4 part 10) frames. There are different frames in MPEG, such as I-frames, P-frames and B-frames. I-frames do not depend on data contained in the preceding or following frames, as they contain a complete picture. P-frames provide more compression than I-frames because they utilize data contained in the previous I-frame or P-frame. When generating a P-frame, the preceding frame is reconstructed and altered according to incremental extrapolation information. B-frame are similar to P-frames, except that B-frames interpolate data contained in the following frame as well as the preceding frame. As a result, B-frames usually provide more compression than P-frames. Typically, every 15th frame or so is an I-frame. P-frames and B-frames might follow an I-frame as follows: IBBPBBPBBPBB(I). The order and number of framews in the sequence can be varied.

Since B and P frames depend on adjacent frames it is necessary that when the STB receives a new channel, it receives a full I-frame before the new channel can be shown. The average time for switching between channels therefore depends on the length of time between I-frames. Typically, for MPEG-2 IPTV content, the length of time is around 0.5 seconds. For MPEG-4 part 10 IPTV content, the length of time between I-frames can be several seconds.

Other sources of delay include:
The buffer in the STB
The time it takes for the IGMP Leave/Join actions to be sent and actioned.

There is therefore a problem in that when an IPTV user changes channel, there can be a significant delay between the STB no longer receiving IPTV content the old channel, and the STB receiving and rendering the IPTV content of the new channel, which is detrimental to the user experience.

Some solutions have been proposed to alleviate the problem associated with the delay in channel switching. For example, an Omicron solution describes fast channel switching between MPEG-streams, although this was not designed for IPTV.

Another solution is to use a Reliable Transmission Protocol (RTP) switch. This switch resides in the network from which the IPTV is broadcast, and buffers RTP streams containing MPEG frames. When the RTP switch receives an IGMP Join message it immediately sends the I-frames from its buffer to the STB.

A further solution is to begin a unicast session when the user changes channel, in order to send the frames to the user as quickly as possible. Once synchronisation of the frames from the unicast with the multicast is possible, then the user switches to receiving the multicast session rather than the unicast session.

A problem with the RTP-switch solution that most channels are encrypted. The RTP-switch therefore has difficulty "seeing" what kind of frames it receives, that is to say whether frames are of I, P or B type. Decrypting and re-encrypting is of course one possible solution, but this would necessitate an expensive increase in processing power required. This is also a problem with the unicast solution described above.

The unicast solution has additional drawbacks. Firstly it requires that the available bandwidth on the "last mile" (for example, the DSL-line connecting the user to the network) is sufficiently high to allow the user to download both unicast and multicast data concurrently, at least for a short time after changing channel In addition, the unicast solution has a scalability problem. For example, when a very popular programme ends, a large number of people who have been watching the programme will then start to zap (the term "zapping" is used herein to mean changing channels using the up and down or the number buttons on a STB remote control) simultaneously. It is not feasible to start unicast session to all those users unless the number of servers is very large. Yet another drawback is that the STB needs to implement the functionality of downloading the unicast and the multicast simultaneously, which can be quite complex.

There is a need for fast channel switching that does not require the STB to simultaneously download a multicast and a unicast, and can also be used for encrypted video multicast streams.

SUMMARY

The invention provides fast channel switching using an RTP switch as described above. In order to overcome the problem with encryption, the invention provides for information being sent to the RTP switch, the information identifying which packets contain complete image frames such as I-frames.

According to a first aspect of the invention, there is provided a method of operating a Reliable Transmission Protocol switch node to provide an IPTV multicast. The method comprises:

receiving IP packets transporting an encrypted media stream from an IPTV Head-end, the media stream containing complete image frames;

receiving unencrypted identifiers identifying packets containing complete image frame data;

storing the received packets in a buffer;
on receipt of a request from a media renderer to provide the IPTV multicast, sending the packet(s) containing the last complete image frame in the media stream and all subsequent packets to the media renderer.

By sending unencrypted identifiers, there is no need for the RTP switch to decrypt the media stream in order to identify packets containing complete image frames.

In one embodiment of the invention, a complete image frame is an I-frame.

The identifiers may be received as a separate message from the media stream, the separate message containing information identifying packet sequence numbers of packets containing complete image frame data.

Alternatively, each identifier may be an identifier packet inserted in the media stream, the identifier packet being inserted immediately prior to a first packet relating to an I-frame. The position of the identifier packet indicates to the RTP switch that the subsequent packet contains complete image frame data.

In an alternative embodiment, the identifiers may be included in a header of a packet relating to a complete image frame. Even though the data transported in the packet is encrypted, the RTP switch can identify from the header that the packet contains encrypted data relating to a complete image frame. In one example, packets containing complete image frames may be accorded a different Class of Service value to packets not containing complete image frames, the Class of Service value identifying which packets relate to complete image frames. In order to ensure that packets are received in the correct order, packets containing the encrypted media stream but having different Class of Service values may be accorded the same priority as other packets in the media stream.

The encrypted media stream may be one of a plurality of encrypted media streams, each encrypted media stream of the plurality of encrypted media stream having complete image frame identifiers associated with it.

The Reliable Transmission Protocol switch node may be located at an Access Node used by the media renderer to access the IPTV multicast, and in one embodiment of the invention, the media renderer is a Set Top Box.

According to a second aspect of the invention, there is provided a Reliable Transmission Protocol switch comprising:
a receiver for receiving IP packets containing an encrypted media stream from an IPTV Head-end, the media stream containing complete image frames;
means for receiving unencrypted identifiers identifying which packets contain complete image frame data;
a buffer for storing the packets; and
a transmitter for, on receipt of a request from a media renderer, transmitting those packets containing the last complete image frame in the media stream and all subsequent packets from the Reliable Transmission Protocol switch node to the media renderer.

According to a third aspect of the invention, there is provide an encryption node for use with an IPTV multicast, the node comprising:
encryption means for encrypting the media stream;
means for identifying packets in the media stream containing complete image frames;
means for transmitting the encrypted media stream to another node; and
means for identifying which encrypted packets contain the complete image frames to the other node.

This node is used where complete image frames are identified at the same node used to encrypt the media stream.

According to a fourth aspect of the invention, there is provide a node for use in an communications network, the node comprising:
means for receiving a media stream;
means for identifying packets in the media stream containing complete image frames; and
means for transmitting data to another node, the data identifying which packets in the media stream contain complete image frames.

This node is used where complete image frames are identified at a different node to that used to encrypt the media stream. In the case where this node is disposed between the encryption node and the RTP switch, the node will also require means to decrypt the media stream in order to identify complete image frames. Alternatively, the node is disposed between the source of the media stream and the encryption node, so no decryption is required.

DETAILED DESCRIPTION

Figure 1:
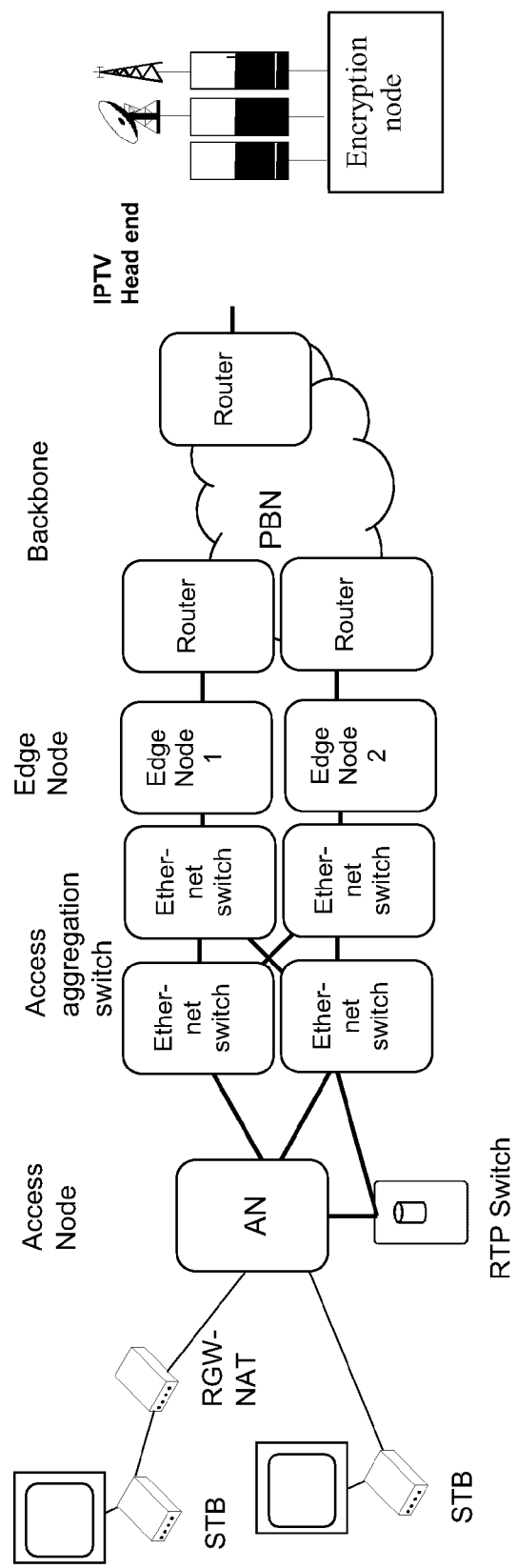
FIG. 1 illustrates schematically the IPTV network architecture.
Figure 2:
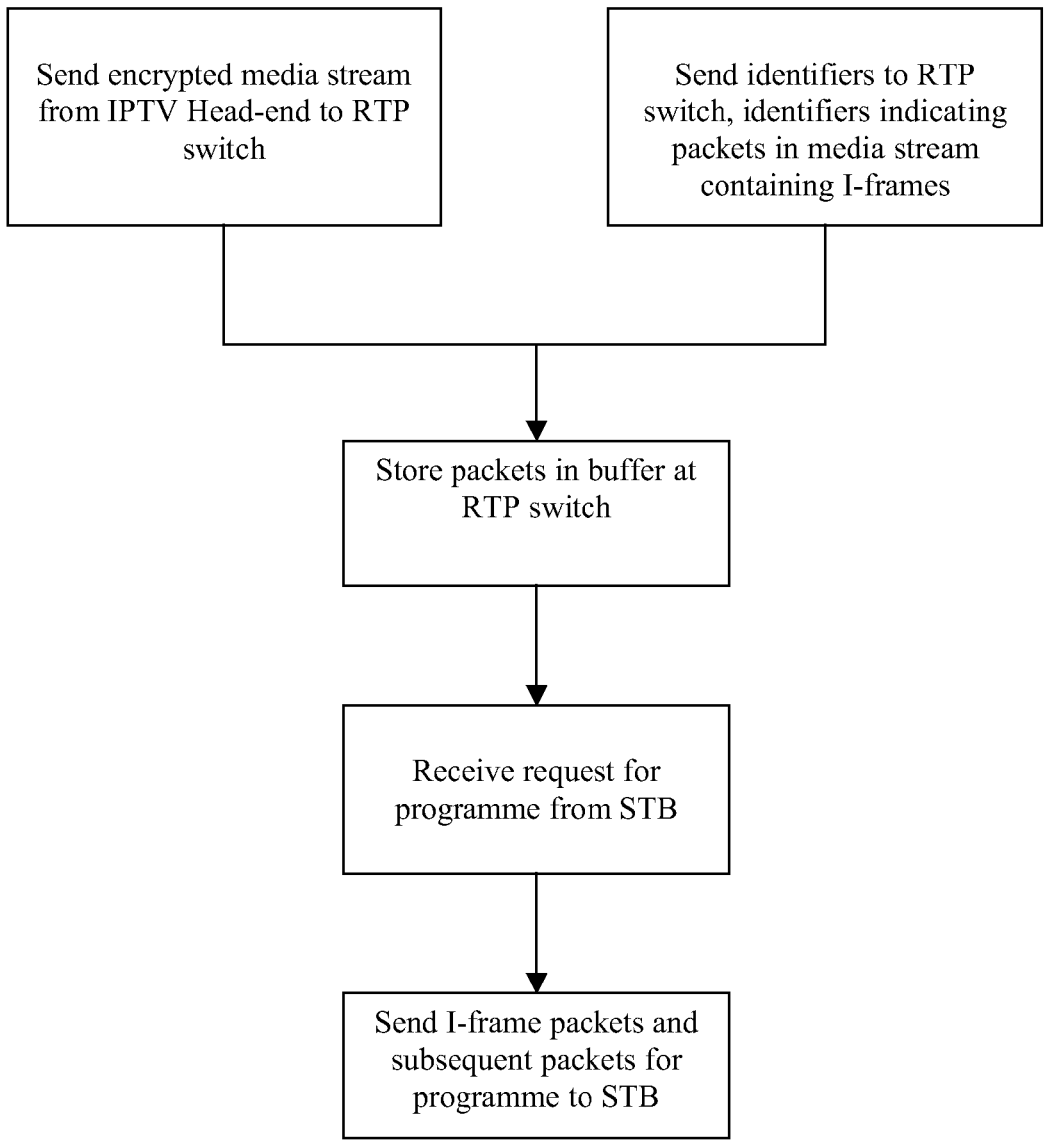
FIG. 2 is a flow diagram showing the basic steps of the invention.
Figure 3:
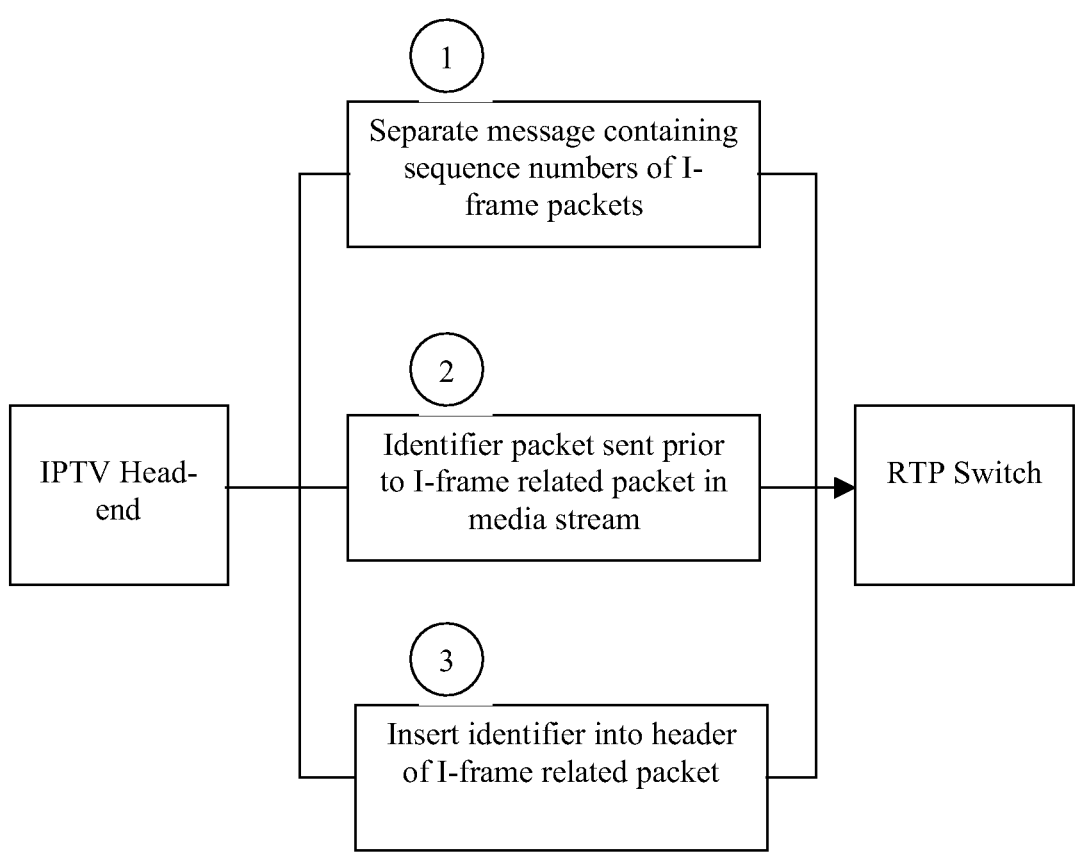
FIG. 3 illustrates schematically three alternative embodiments of the invention for informing the RTP switch which packets relate to I-frames.

Referring to FIG. 1, there is illustrated an IPTV Head-end, which generates an IPTV multicast media stream. The IPTV Head-end includes an encryption node, which encrypts the IPTV media stream. The encrypted media stream passes through a router and ultimately the last node traversed by the IPTV media stream in the operator's network is an Access Node (AN). Where a user is accessing the IPTV multicast using DSL, the AN is a Digital Subscriber Line Access Multiplexer (DSLAM).

The user receives the encrypted IPTV media stream at a Set Top Box (STB), in some cases via a Residential Gateway (RGW). The STB decrypts the media stream and renders it on the user's television (or other viewing equipment)

An RTP switch is also provided functionally located between the STB and the IPTV Head-end. The RTP switch that may be implemented as part of the Access Node or may be a separate node. The RTP switch receives all of the IPTV media streams sent from the IPTV Head-end. It stores all packets from the media stream in a buffer, and when a user requests access to a particular IPTV channel, the RTP switch sends the media stream packets beginning with the start of the last I-frame, and all subsequent packets (including P-frame and B-frame packets) to the STB of the requesting user. This allows the STB to start rendering the media stream on the user's television as soon as the packets are received from the RTP switch, rather than waiting for the next I-frame to be sent in the media stream. This makes rendering of a new channel quicker where a user first turns on their STB or, more commonly, changes between channels.

As described above, the RTP switch cannot "see" which packets in the media stream relate to I-frames when the IPTV media stream is encrypted. In order to allow the RTP switch to know which packets of an encrypted media stream relate to I-frame packets, the RTP is further provided with identifying information that identifies those packets that relate to an I-frame (or IDR frames in the case of MPEG 4 part 10).

The video in the IPTV multicast may be transported directly using its RTP payload format inside RTP packets, in which case it is relatively easy to find the start of the I- (or IDR) frame at the start of a packet, and the rest of the frame is then contained in consecutive packets with the same time stamp value.

If the MPEG-2 transport layer is used, all MPEG data is partitioned into transport packets (188 bytes each) that are in turn grouped and sent in RTP packets (usually in groups of 7). In this case, a deeper analysis is needed to determine whether an I-frame starts in a packet, but the principles of signaling in which packet the I-frame picture starts remain the same.

The RTP switch must know which IP packet contains the first MPEG I-frame packet. The invention allows for several different methods sending this information to the RTP switch and on to the STB as follows:

1. Sequence number information identifying packets containing I-frames is sent from the IPTV Head-end to the RTP switch. The RTP and Secure Real-time Transport Protocol (SRTP, the encrypted variant of RTP) packet headers contain sequence numbers that can be used to identify packets containing the first I-frame MPEG packet. A separate message containing the sequence numbers of interest is sent to the RTP switch. Alternatively, the sequence numbers can be included in packets in the media stream, and not sent separately.

2. Alternatively, the encryption node at the IPTV Head-end can insert a special-purpose IP-packet in the stream immediately prior to the IP-packet containing the first MPEG I-frame packet. This identifies that subsequent packets contain I-frame data. The special purpose IP packet is sent with the same class of service (COS) as the other packets in the IPTV media stream to ensure that the packets are received in the correct order, and that the special purpose packet immediately precedes an I-frame packet. An advantage with this solution is that it can be used for transport protocols that do not rely on sequence numbers, for example if SRTP is not being used to transport the media stream.

3. COS marking is used to differentiate which packets in the media stream contain I-frame data, and which packets do not contain I-frame data. For example, the encryption node stamps all packets that contain I-frame data with a COS value of 7, and all packets that do not contain I-frame data with a COS value of 6. In this way, the RTP switch can differentiate which packets contain I-frame data and which do not. The network is configured to give both those classes the same priority in order to guarantee that the packets are received in the correct order. Note that there are also other fields that could be used to mark the packets that contain I-frames.

In summary, I-frame packets in an encrypted media stream can be identified to the RTP switch using any of the following:
1. Sequence number
2. Extra ID packets
3. Packet marking/differentiation The invention provides a solution for fast channel switching or initiation of an IPTV multicast, which poses no requirement on the STB, and which works for encrypted video multicast streams.

It will be appreciated by the person of skill in the art that various modifications may be made to the above described embodiments without departing from the scope of the present invention. For example, the invention has been described with reference to a Set Top Box, but applies equally to other types of media renderer, in particular mobile devices.

The invention claimed is:

1. A method of operating a Reliable Transmission Protocol switch node to provide an IPTV multicast, the method comprising:
    receiving encrypted IP packets transporting an encrypted media stream from an IPTV Head-end, the encrypted media stream containing complete image frames;
    receiving unencrypted identifiers identifying encrypted packets containing complete image frame data;
    storing the received encrypted packets in a buffer;
    on receipt of a request from a media renderer to provide the IPTV multicast, sending the encrypted packet(s) containing the last complete image frame in the encrypted media stream and all subsequent encrypted packets to the media renderer;
    wherein encrypted packets containing complete image frames are accorded a different Class of Service value to packets not containing complete image frames, the Class of Service value included in the packet header and identifying which packets relate to complete image frames.

2. A method of operating a Reliable Transmission Protocol switch node according to claim 1, wherein a complete image frame is an I-frame.

3. A method of operating a Reliable Transmission Protocol switch node according to claim 1, wherein the identifiers are received as a separate message from the media stream, the separate message containing information identifying packet sequence numbers of encrypted packets containing complete image frame data.

4. A method of operating a Reliable Transmission Protocol switch node according to claim 1, wherein each identifier is an identifier packet inserted in the media stream, the identifier packet being inserted immediately prior to a first packet relating to a complete image frame.

5. A method of operating a Reliable Transmission Protocol switch node according to claim 1, wherein the identifiers are included in a header of a packet relating to a complete image frame.

6. A method of operating a Reliable Transmission Protocol switch node according to claim 5, wherein encrypted packets containing the encrypted media stream but having different Class of Service values are accorded the same priority.

7. A method of operating a Reliable Transmission Protocol switch node according to claim 1, wherein the encrypted media stream is one of a plurality of encrypted media streams, each encrypted media stream of the plurality of encrypted media stream having associated complete image frame identifiers.

8. A method of operating a Reliable Transmission Protocol switch node according to claim 1, wherein the Reliable Transmission Protocol switch node is located at an Access Node used by the media renderer to access the IPTV multicast.

9. A method of providing an IPTV multicast according to claim 1, wherein the media renderer is a Set Top Box.

10. The method of claim 1, wherein the unencrypted identifiers enable differentiation of packets containing complete image frames from packets that do not contain complete image frames.

11. A Reliable Transmission Protocol switch comprising:
    a receiver for receiving encrypted IP packets containing an encrypted media stream from an IPTV Head-end, the encrypted media stream containing complete image frames;
    means for receiving unencrypted identifiers identifying which encrypted packets contain complete image frame data;

a buffer for storing the encrypted packets; and a transmitter for, on receipt of a request from a media renderer, transmitting those encrypted packets containing the last complete image frame in the encrypted media stream and all subsequent encrypted packets from the Reliable Transmission Protocol switch node to the media renderer;

wherein encrypted packets containing complete image frames are accorded a different Class of Service value to packets not containing complete image frames, the Class of Service value included in the packet header and identifying which packets relate to complete image frames.

12. An encryption node for use with an IPTV multicast, the node comprising:

encryption means for encrypting the media stream;

means for identifying encrypted packets in the media stream containing complete image frames;

means for transmitting the encrypted media stream to another node; and means for identifying which encrypted packets contain the complete image frames to the other node;

wherein encrypted packets containing complete image frames are accorded a different Class of Service value to packets not containing complete image frames, the Class of Service value included in the packet header and identifying which packets relate to complete image frames.

13. A node for use in a communication network, the node comprising:

means for receiving a media stream;

means for identifying encrypted packets in the media stream containing complete image frames; and means for transmitting data to another node, the data identifying which encrypted packets in the media stream contain complete image frames;

wherein encrypted packets containing complete image frames are accorded a different Class of Service value to packets not containing complete image frames, the Class of Service value included in the packet header and identifying which packets relate to complete image frames.

14. A node for use in a communication network according to claim 13, the node further comprising means for decrypting the received media stream.

* * * * *

UNITED STATES PATENT AND TRADEMARK OFFICE
CERTIFICATE OF CORRECTION

| | | |
|---|---|---|
| PATENT NO. | : 8,416,797 B2 | Page 1 of 1 |
| APPLICATION NO. | : 12/514239 | |
| DATED | : April 9, 2013 | |
| INVENTOR(S) | : Cedervall et al. | |

It is certified that error appears in the above-identified patent and that said Letters Patent is hereby corrected as shown below:

On the Title Page, in Item (75), under "Inventors", in Column 1, Line 1, delete "Härnösand" and insert -- Härnösand --, therefor.

On the Title Page:

The first or sole Notice should read --

Subject to any disclaimer, the term of this patent is extended or adjusted under 35 U.S.C. 154(b) by 132 days.

In the Specification

In Column 1, Line 28, delete "channel" and insert -- channel. --, therefor.

In Column 2, Line 35, delete "channel" and insert -- channel. --, therefor.

In Column 4, Lines 24-25, delete "architecture; and" and insert -- architecture. --, therefor.

In Column 4, Line 46, delete "equipment)" and insert -- equipment). --, therefor.

In Column 5, Line 57, delete "marking/differentiation" and insert -- marking/differentiation. --, therefor.

Signed and Sealed this
Eighteenth Day of June, 2013

Teresa Stanek Rea
*Acting Director of the United States Patent and Trademark Office*